March 14, 1961 H. M. FOX 2,974,476
ROCKET WITH GASEOUS EFFLUENT GUIDE
Filed Jan. 5, 1953
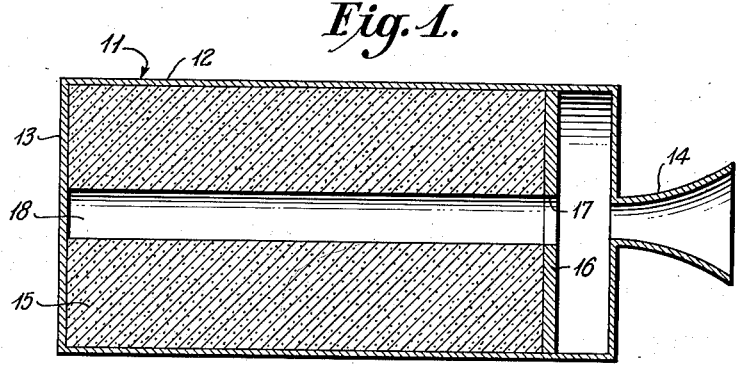
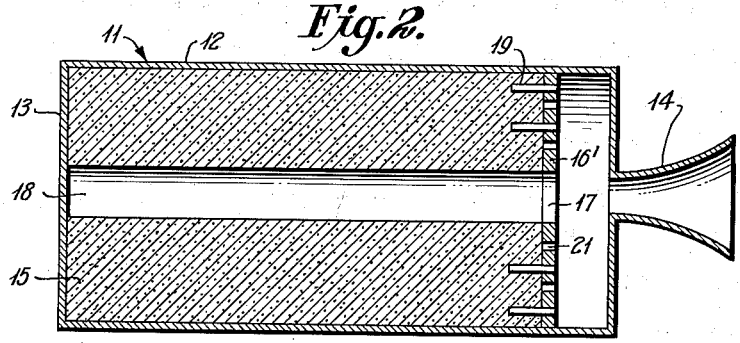
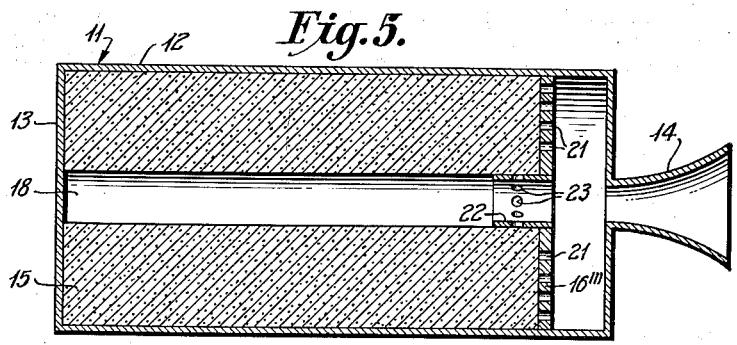
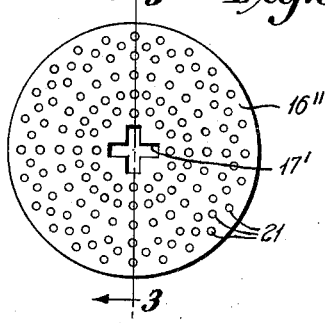
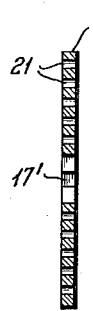
INVENTOR.
H.M. Fox
BY
ATTORNEYS United States Patent Office 2,974,476
Patented Mar. 14, 1961

2,974,476

ROCKET WITH GASEOUS EFFLUENT GUIDE

Homer M. Fox, Bartlesville, Okla., assignor to Phillips Petroleum Company, a corporation of Delaware Filed Jan. 5, 1953, Ser. No. 329,537

5 Claims. (Cl. 60—35.6)

This invention relates to rockets. In one of its more specific aspects, it relates to rockets using hollowed solid propellant charges. In another of its more specific aspects, it relates to means for preventing erosive burning of hollowed solid propellant charges. In another of its more specific aspects, this invention relates to a rocket utilizing a gaseous effluent guide wherein ammonium nitrate is the propellant.

One of the well recognized difficulties encountered in rockets utilizing ammonium nitrate propellants is the inherent brittleness of such a propellant. A further difficulty encountered in the use of such a propellant is the maintaining of a uniform burning of the propellant. At times when erosive burning occurs, uneven surfacing and cracking take place. Particles are broken from the downstream end of the propellant charge, thus enlarging the burning surface and materially increasing the burning area. The increased burning materially increases the amount of gases released by combustion of the propellant and leads to a dangerous increase of pressure within the rocket chamber.

The objects of this invention will be attained by the various aspects of this invention.

An object of this invention is to provide means for preventing erosive burning of a hollowed solid rocket propellant charge. Another object of the invention is to provide means for preventing undue pressure buildup in the rocket chamber. Another object of this invention is to provide an automatically enlargeable gaseous effluent guide at the downstream end of the propellant charge. Another object of the invention is to provide means for preventing the channeling of high velocity product gases over easily erodable propellant. Another object of the invention is to provide a gaseous effluent guide, the orifice of which will enlarge with the enlargement of the hollowed section within the rocket propellant. Another object of the invention is to increase reproducibility of pressure and time correlation and thus, rocket ballistics. Other and further objects of this invention will be apparent to those skilled in the art upon study of the accompanying disclosure.

Broadly speaking, this invention comprises the improvement of a gaseous effluent guide at the downstream end of a hollowed solid rocket propellant. Such a guide preferably is made of a material which will be slowly consumed at high temperatures. Materials such as hard carbon and aluminum are preferred for the construction of the gaseous effluent guide of this invention. The gaseous effluent guide of this invention has a centrally disposed orifice substantially corresponding in size to the initial opening through the rocket propellant. In one aspect, the guide has an escape orifice of fixed size, thereby preventing erosive burning and fracturing of the downstream end of the rocket propellant. Such a guide is in some modifications provided with additional small openings therethrough which will permit the escape of product gas with the continued increase in burning area and resulting increase in gaseous effluent. In another of its aspects, such a gaseous effluent guide is provided with a sleeve member which extends into the opening through the rocket propellant, thus preventing chipping and breaking of the propellant at its downstream end. Such a guide is also provided with small orifices which permit the escape of gas therethrough as greater portions of the propellant are consumed. In yet another aspect, a plurality of arms are provided on the upstream side of the gaseous effluent guide so as to aid in anchoring the guide against the downstream end of the solid rocket propellant. Small orifices are also provided intermediate the primary gas opening through the guide and the periphery of the guide. In another and preferred aspect of the invention, the gaseous effluent guide is made of a consumable material. The primary gas opening through such a guide is slowly enlarged by the hot product gases passing therethrough, thus increasing the size of the gaseous outlet to correspond to the increase in the size of the opening through the rocket propellant.

Better understanding of this invention will be obtained upon reference to the drawings, wherein Figure 1 is a sectional view of a rocket utilizing one type of gaseous effluent guide of this invention.

Figure 2 is a sectional view showing a modification of the gaseous effluent guide of this invention.

Figure 3 is an end view of a gaseous effluent guide of this invention.

Figure 4 is a side view of a gaseous effluent guide of this invention.

Figure 5 is a sectional view of a rocket utilizing another modification of the gaseous effluent guide of this invention.

Referring particularly to Figure 1 of the drawings, rocket 11 comprises shell 12 which is closed at its upstream end by closure member 13 and is provided with a rearwardly extending nozzle in its downstream end. A hollowed propellant 15 is provided within shell 12 and is contacted at its periphery and at its upstream end by the walls of shell 12. Gaseous effluent guide 16 is provided within shell 12, transversely positioned therein and is anchored in position against the downstream end of propellant 15. Gaseous effluent guide 16 is provided in its central portion with a gaseous outlet opening 17 which preferably corresponds in size to the opening 18 extending through the length of propellant 15. Gaseous effluent guide 16 is preferably constructed of a material which is slowly consumed when directly contacted with an atmosphere of hot gas. Materials such as hard carbon or aluminum are very satisfactory for such construction.

In the operation of the device shown in Figure 1 of the drawings, propellant 15 is ignited in any of the conventional methods of the art such as by the ignition of a separate ignitor charge which can be placed in either the upstream or downstream end of the propellant. A blowout disk, not shown, is normally used in nozzle 14 so as to improve ignition and maintain the propellant in a dry condition until the rocket is put into use. When the propellant is ignited, pressure builds up instantaneously within the cavity formed in the propellant, with the result that sufficient pressure is exerted against the blowout plate that that plate is blown out of nozzle 14, thus permitting the normal escape of high velocity product gases through the nozzle. As the hot product gases flow through outlet 17 the surface of that outlet is subjected to heat by direct heat exchange with the high temperature effluent gases. The guide material is slowly consumed in this fashion, thus enlarging outlet 17 correspondingly with an increase in the size of the opening through propellant 15.

Referring to Figure 2 of the drawings, parts like those described in connection with Figure 1 are designated by like numerals. The gaseous effluent outlet guide 16' is provided with arms 19 on its upstream side, the arms extending into restrictor material between guide 16' and propellant 15. Secondary gaseous material outlets 21 which are individually relatively small in size when compared with outlet 17 are provided through gaseous effluent guide 16' intermediate outlet 17 and the periphery of the guide.

In the operation of the device shown as Figure 2 of the drawings, propellant 15 is ignited in any conventional manner such as described in connection with Figure 1 of the drawings. Burning takes place along the entire length of propellant 15 in opening 18. Guide 16' prevents small particles from being eroded from the downstream end of propellant 15 thus substantially maintaining a uniform burning of propellant 15. Arms 19 aid in maintaining guide 16' against the downstream end of propellant 15. As additional portions of propellant 15 are consumed, additional secondary outlets 21 are made available for the passage of product gases into nozzle 14.

Referring particularly to Figure 3 of the drawings, the gaseous effluent guide member 16" is provided with primary outlet 17' and a plurality of secondary outlet 21 distributed intermediate outlet 17 and the periphery of member 16". Figure 4 shows a section of one form of gaseous effluent guide 16" of Figure 3.

Referring particularly to the device shown in Figure 5 of the drawings, parts like those described in connection with Figures 1 and 2 of the drawings are designated by like numbers. Gaseous effluent guide 16''' is provided with a primary outlet 17 and a plurality of secondary outlet conduits 21. Sleeve member 22 extends from the upstream end of guide 16''' a short distance into but is not bonded to propellant 15 and is coaxially positioned with respect to primary outlet 17 and opening 18 through propellant 15. Openings 23 are provided through sleeve member 22 so as to permit the escape of gaseous products therethrough upon the burning of propellant 15 to such an extent that opening 18 becomes considerably larger than sleeve member 22. As the area of opening 18 increases, additional secondary conduits 21 become available through guide 16''' so as to permit the escape of product gases therethrough.

In the operation of the device shown in Figure 5 of the drawings, propellant 15 is ignited in any manner as is set forth hereinabove. As the propellant burns along its entire length through opening 18, opening 18 is enlarged in size and product gases are exhausted from the combustion space through opening 17. As opening 18 becomes larger than sleeve 22, a portion of the gases are permitted to flow through conduits 23 in sleeve 22 and out through opening 17 and additional portions of the gaseous products are exhausted through secondary outlets 21.

The specific configuration of the opening 18 through propellant 15 or of outlet 17 is not critical to this invention. However, some propellant opening configurations, being non-cylindrical have corners and edges which are particularly susceptible to erosive burning. It is preferred that outlet 17 or 17' be of substantially the same configuration as the opening through propellant 15 so as not to impose undue resistance to outgoing product gases.

Various other modifications will be apparent to those skilled in the art upon study of the accompanying disclosure. Such modifications are believed to be clearly within the spirit and scope of this invention.

I claim:

1. A rocket comprising an elongated outer shell, closed at one end and open at the other end; a solid propellant closely encompassed by the walls and closed end of said shell, said propellant being hollowed from its end adjacent the open end of said shell; a gaseous effluent guide positioned in the open end portion of said shell and against the end of said propellant, said guide having a first opening therethrough corresponding to the opening in said propellant and a plurality of secondary openings distributed intermediate said first opening and the periphery of said guide, which secondary openings prevent the passage of solid particles but permit the flow of gaseous materials therethrough; and a sleeve affixed to the side of said gaseous effluent guide adjacent said propellant and extending into the hollowed portion of said propellant, said sleeve having an opening therethrough corresponding in size and alignment to said first opening through said gaseous effluent guide and to the opening in said propellant.

2. The rocket of claim 1 wherein a plurality of gas vents extends through the wall of said sleeve.

3. A rocket comprising an elongated outer shell, closed at one end and open at the other end; a solid propellant closely encompassed by the walls and closed end of said shell, said propellant being hollowed from its end adjacent the open end of said shell; and a gaseous effluent guide formed of hard carbon and positioned in the open end portion of said shell and against the end of said propellant, said guide having a first opening therethrough corresponding to the opening in said propellant.

4. A rocket comprising an elongated outer shell, closed at one end and open at the other end; a solid propellant closely encompassed by the walls and closed end of said shell, said propellant being hollowed from its end adjacent the open end of said shell; and a gaseous effluent guide formed of aluminum and positioned in the open end portion of said shell and against the end of said propellant, said guide having a first opening therethrough corresponding to the opening in said propellant.

5. A rocket comprising an elongated outer shell, closed at one end and open at the other end; a solid propellant closely encompassed by the walls and closed end of said shell, said propellant being hollowed from its end adjacent the open end of said shell; and a gaseous effluent guide, formed of a slowly combustible material selected from the group consisting of hard carbon and aluminum, positioned in the open end portion of said shell and against the end of said propellant, said guide having a first opening therethrough corresponding to the opening in said propellant.

References Cited in the file of this patent

UNITED STATES PATENTS 1,901,852     Stolfa et al.            Mar. 14, 1933

FOREIGN PATENTS 922,209     France                Jan. 27, 1947